March 12, 1929.  S. G. SEARS  1,705,031
SPEED ALARM CONTROL DEVICE
Filed Nov. 20, 1926    3 Sheets-Sheet 1
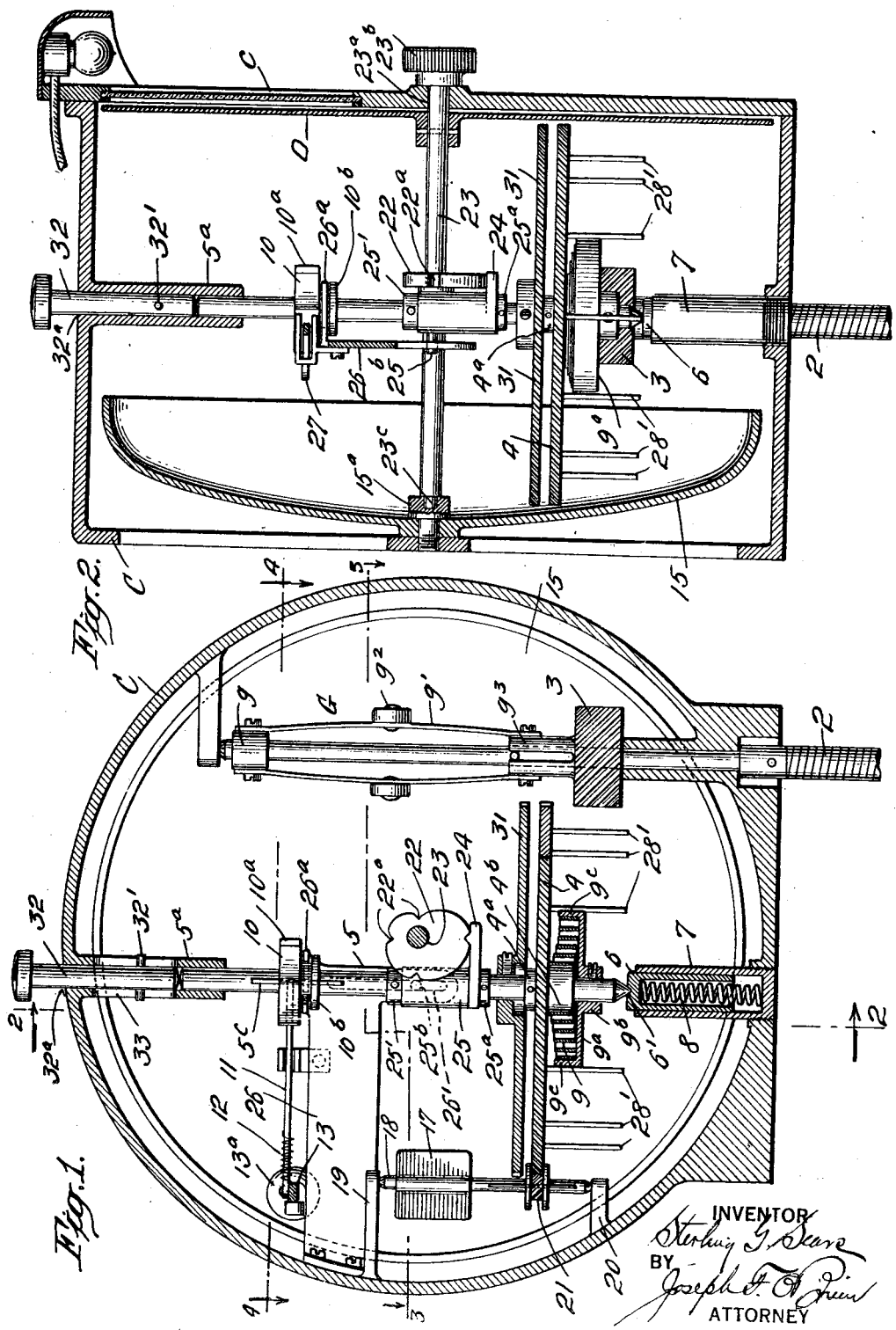

March 12, 1929.  S. G. SEARS  1,705,031
SPEED ALARM CONTROL DEVICE
Filed Nov. 20, 1926  3 Sheets-Sheet 2
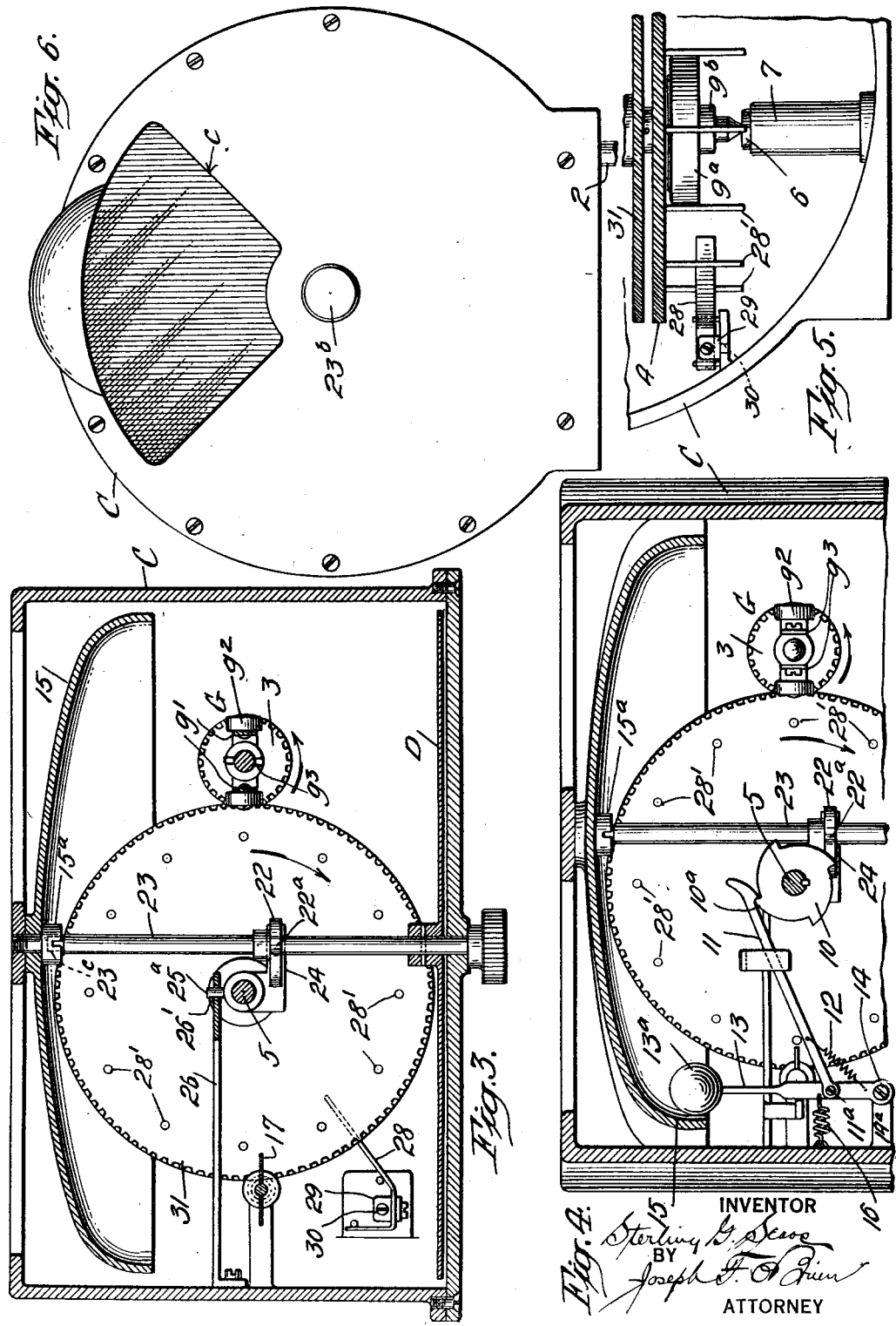

March 12, 1929.  S. G. SEARS  1,705,031
SPEED ALARM CONTROL DEVICE
Filed Nov. 20, 1926  3 Sheets-Sheet 3
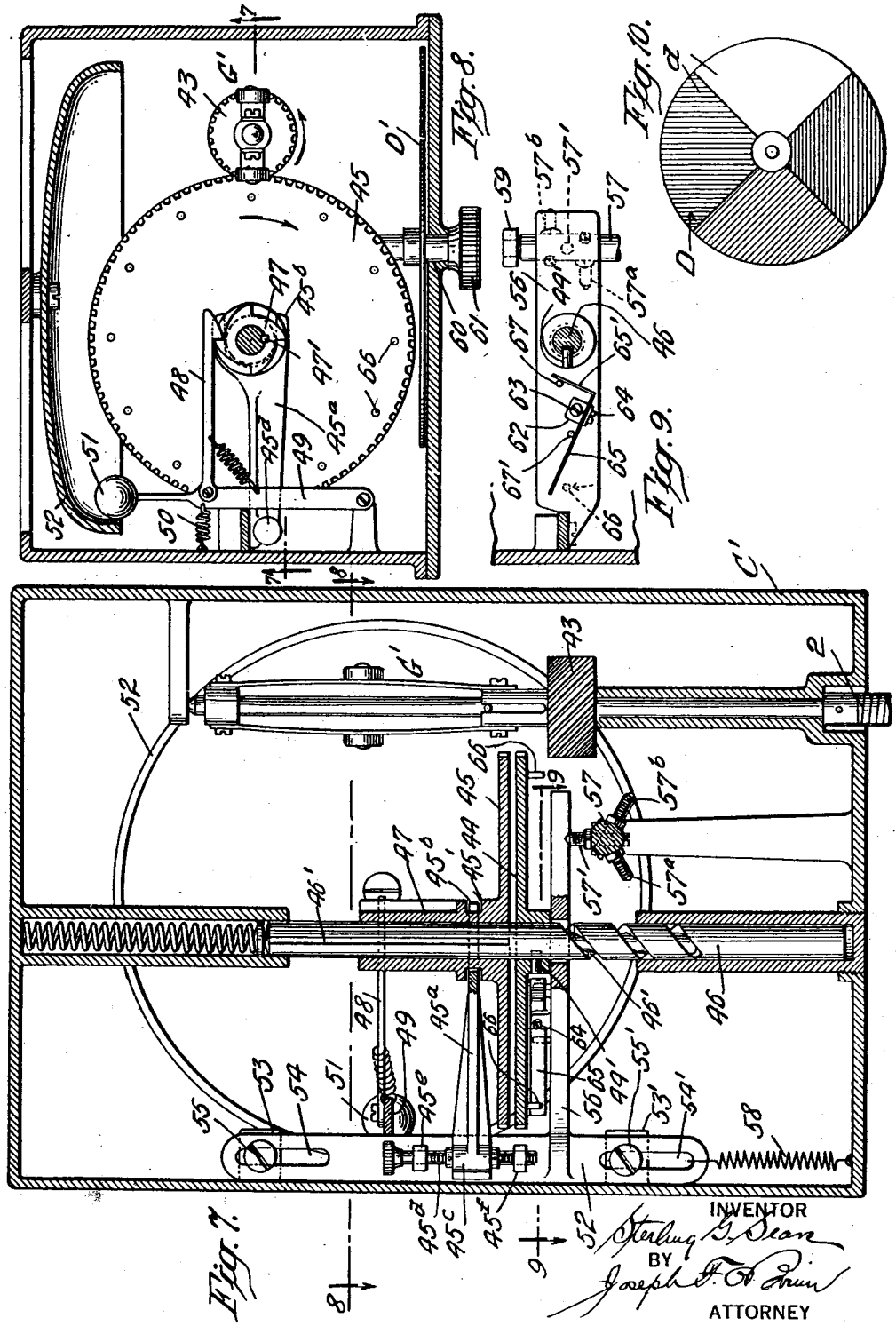

Patented Mar. 12, 1929.

1,705,031

UNITED STATES PATENT OFFICE.

STERLING G. SEARS, OF BROOKLYN, NEW YORK, ASSIGNOR TO NAYLOR RADIO CORPORATION, A CORPORATION OF NEW YORK.

SPEED-ALARM-CONTROL DEVICE.

Application filed November 20, 1926. Serial No. 149,732.

This invention relates to improvements in speed alarm control devices.

One of the objects of this invention is to provide a device adapted to be mounted in exposed position on an automobile which is capable of being set to give a signal or alarm preferably comprising the ringing of a bell, when a given or set speed is reached and continued or exceeded beyond a predetermined interval, thus permitting the given or affixed speed to be reached and even exceeded for a short distance in case of emergencies, but giving the signal or alarm in the event that the speed is continued or exceeded beyond the emergency or grace interval.

Another object of the invention is to provide means for indicating at a glance the speed at which the signal or alarm device is set to operate, thus enabling the public generally and law-enforcing officers in particular to note whether the law is being violated by the automobile carrying my signal or alarm device.

Another object of the invention is to provide in combination with a device arranged to give a signal or alarm when a set speed preferably indicated thereby is continued or exceeded for a predetermined time period of means for giving the operator an initial warning signal during the time interval or period in which he is continuing or exceeding said set speed.

Another object of the invention is to provide in combination with a device operable to give a signal or alarm in the event that a vehicle on which the device is mounted continues or exceeds a set speed for a predetermined time interval, of means which will immediately and without any emergency or grace period give an alarm in the event that a second fixed speed is reached or exceeded.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a vertical section of the device embodying my invention;

Fig. 2 is another vertical section on the line 2—2 of Fig. 1, looking in the direction of the arrow;

Fig. 3 is a section on the line 3—3 of Fig. 1, looking in the direction of the arrow;

Fig. 4 is another section on the line 4—4 of Fig. 1, looking in the direction of the arrow;

Fig. 5 is a fragmentary view, in elevation, of the lower left hand portion of the device showing the preferred form of signal for warning the car operator;

Fig. 6 is a front elevation of my preferred form of device;

Fig. 7 is a central vertical section substantially on the line 7—7 of Fig. 8, showing a modified form of device embodying my invention;

Fig. 8 is a section on the line 8—8 of Fig. 7, looking in the direction of the arrow;

Fig. 9 is a fragmentary section on the line 9—9 of Fig. 7, looking in the direction of the arrow; and Fig. 10 is a front elevation of the colored disc employed by me removed from the casing.

Referring now specifically to Figs. 1 to 6 and 10 of these drawings which illustrate a preferred embodiment of my invention, C indicates a casing adapted to be carried in visible or exposed position on an automobile, and having a front plate provided with a glazed opening $c$ preferably sector-shaped in conformation to expose one of a plurality of sector-shaped colored portions $d$ on a disc D rotatably mounted within the casing and controlled as hereinafter specified to indicate the speed at which a signal or alarm is set to operate by my invention.

Mounted within the casing C is a suitable mechanism having a movement variable in accordance with the speed of the vehicle, and preferably comprising, as shown, a centrifugal governor G to which rotary motion is imparted by a flexible shaft 2 driven from a rotating element such as the wheels of the vehicle, and also suitably mounted within said casing is an alarm-operating mechanism A actuatable by the speed variable mechanism G to sound an alarm or give a signal under set conditions hereinafter specified.

As illustrated, the centrifugal governor G is of conventional form and comprises a collar $g$ fixed on a shaft 1 to which is attached flexible arms $g^1$ provided intermediate their ends with weights $g^2$ and connected at their lower ends to a collar $g^3$. This is the conventional form of governor and it will be obvious that the lower collar $g^3$ will move vertically in accordance with the speed of the vehicle. The lower collar $g^3$ in the embodiment illustrated, carries an engaging member 3. The member 3 being connected to the governor G is movable in proportion to the speed of the vehicle and is adapted to engage and operate my signal or alarm-operating mechanism at a predetermined point or points in its speed-variable movement, so that the positioning of one or more actuating members in fixed positions along the path of movement of said engaging member 3 so as to be engaged thereby, will cause a signal to be given at any speed at which the actuating members are set to engage.

My signal or alarm mechanism is also mounted within the casing C and comprises a gear or pinion 4 mounted to rotate on a spindle 5 which, in the embodiment shown, is mounted at its upper end in a bearing above $5^a$ and at its lower end is pointed as at $5^c$ and bears in a bearing depression $6'$ formed in a tubular plunger 6 mounted in a bearing 7 normally pressed upwardly by means of a spring 8. It will be apparent that by adjustment of the vertical position of the pinion 4 I will be enabled to set the speed at which it will be engaged by the member 3, and one of the objects of this invention is to defer the giving of the signal or alarm for a predetermined period of time after such engagement has been effected so as to permit an operator to reach the set speed and still before the alarm or signal is given to have an emergency or grace period during which the set speed may be continued or exceeded. This permits short spurts of speed within prescribed distances, for example, two hundred or two hundred and fifty feet, to be made. Such short spurts of speed are often necessary in traffic regulation and in many jurisdictions no violation of the law occurs until the speed limit has been exceeded for more than a predetermined distance.

With this end in view, the shaft 5 is so connected with the alarm-giving mechanism as to give an alarm immediately upon rotation and to defer this giving of the alarm a spiral spring 9 is interposed between the pinion member 4 and the said shaft 5 so that upon engagement of the member 3 with the pinion 4, the spring 9 will first be wound up and when so wound up will form a connection between the said pinion member 4 and the shaft 5 which will then rotate together. Rotation of the shaft 5 causes rotation of a ratchet wheel 10 fixed thereon, and this ratchet wheel cooperates with a ratchet lever 11 and striker 13 to sound the alarm. As shown, the lever 11 has a hook $11^a$ normally held in engagement with a tooth $10^a$ of said ratchet wheel 10 by a spring 12. The lever 11 is pivoted at $11^b$ to a striking arm 13 having a hammer or ball $13^a$ at is outer end and pivoted at 14 on a bracket $14^a$ extending from the casing.

The rotation of the ratchet pulls the lever 11 and striker arm 13 through its engagement with a tooth thereof till the said tooth in its rotation is lowered out of engagement with said hook $11^a$ to release the lever 11 and arm 13, and upon such release, the ball $13^a$ is forcibly pulled into contact with the bell 15 by a spring 16 stretched between said arm 13 and the side of the casing, and this operation is repeated continuously during rotation of the shaft 5.

It will be apparent, therefore, that when the spring 9 is wound up to connect the pinion member 4 with the shaft 5, the bell will be continuously rung so long as the pinion member 4 is rotated. It will also be apparent, as above stated, that the member 4 will be rotated to cause the bell to be struck only after it is connected with the shaft 5 through the retarding spring 9; also that the length of the spring 9 may be arranged to defer the ringing of the alarm for any predetermined period during the engagement of the member 4 by the engaging member 3 of the speed-variable mechanism and that the speed set by the positioning of the pinion 4 may be maintained or exceeded for a time interval depending upon the period it takes to wind up the spring 9 before the alarm bell will be struck by the striker arm 13 and that I have, therefore, provided alarm-giving mechanism which will operate for a set speed and which will permit this speed to be maintained or exceeded for a short distance which may also be fixed or adjusted, and that if during this interval the speed is lowered no alarm will be given.

The position of the member 4 may be adjusted in any suitable manner and, as illustrated, it is maintained against sliding movement on the shaft at one side by the collar $4^a$ fixed to the shaft and at the other side by the spring enclosing casing $9^a$ which has a hub portion $9^b$ fixed to the shaft and a peripheral portion $9^c$ which is connected to the spring, the inner end of the spring 9 being connected to a hub $4^b$ formed integrally with the member 4. The member 4 will, therefore, during the winding of the spring, be capable of rotation independently of the shaft 5 and thereafter will rotate in unison therewith, but its position vertically on the shaft will be definitely fixed.

In the said embodiment shown in Figs. 1 to 6, the alarm-controlling gear 4 being so fixed on the shaft 5 may, by vertical adjustment of the shaft, be caused to give the alarm or signal at varying speeds as the engagement of this member 4 will thus take place at varying positions of the member 3.

In order to adjust the position of this member 4 to varying speeds, I provide a cam 22 having a series of depressions $22^a$ at varying distances from the center of an adjusting shaft 23 which preferably extends transversely and, as shown, is mounted in a bearing aperture 23ª in the front of the casing and is provided with a knob 23ᵇ at the front end thereof while the rear end 23ᶜ is reduced in diameter and bears in a screw head 15ª which secures the bell 15 to the casing C. As illustrated, the cam 22 may be caused to engage with any suitable means for causing the shaft to be raised and lowered and, as illustrated, the perimeter of the cam engages with a shelf or arm 24 formed integrally with a sleeve 25 swivelled on the shaft 5 and held against vertical displacement in relationship to the said shaft by fixed collars 25′, 25ª. The swivel sleeve 25 carrying the shelf 24 is preferably prevented from rotating with the shaft 5 by providing at one side of said member 25 a pin 25ᵇ which extends into and slides within a vertical slot 26′ in a stationary L-shaped arm 26 suitably fastened at one end to the side of the casing and at the other end connected to and forming support for a ratchet guide 27. The arm 26 has a horizontally-extending portion 26ª forked and forming a shelf to maintain the ratchet 10 in fixed position on the shaft and said ratchet is preferably provided with an integral grooved collar 10ᵇ into which the forked portion 26ª extends, the said ratchet 10 being thus mounted to rotate with the shaft but to maintain a fixed position in relation to the ratchet lever 11. In order to permit the shaft 5 to slide relatively to said ratchet wheel 10, the shaft 5 is, as shown, provided with a slot 5ᶜ and the ratchet 10 is provided with a pin 10ᶜ keying into said slot.

The cam 22 has four positions at varying distances from the center of the adjusting shaft 23 and I preferably fix on said cam shaft the colored disc D having the sector-shaped portions $d$ as more particularly shown in Figs. 5 and 10, it being understood that these colored portions register with the various positions of the cam and that a different color or will be exposed through the openings $c$ for each position of the cam.

It is desirable to prevent the too rapid reverse movement of the member 4 by the spring 9 upon disengagement from the member 3 and for this purpose, I provide means for controlling such reverse movement. As illustrated, such movement is controlled by a fly leaf 17 mounted on a shaft 18 in bearing brackets 19 and 20 respectively, extending from the side of the casing, this shaft 18 being provided with a pinion 21 engaging with the teeth of the pinion 4 and preferably being movable with said pinion along the shaft 18 to follow the position of the member 4.

The spring 9 also is preferably slightly coned above the casing 9ª to allow a more resilient meshing between the members 4 and 3.

It is desirable when the set, alarm-giving speed is reached to warn the operator of the vehicle that this condition exists so as to allow him to reduce his speed before the emergency time period, which will correspond to a given or predetermined distance, expires and to this end I provide the member 4 with a series of pins or projections 4ᶜ which, when said member 4 is rotated, are adapted to engage an initial-warning element. As shown, this warning element is in the form of a spring arm 28 fastened to a block 29, pivoted on a spindle 30 suitably supported in the casing, said spring-arm 28 having a free end arranged to strike against pins 28′ in the bottom of the gear 4, thus providing means for giving an initial warning that the fixed speed has been reached and that unless the speed is reduced within a predetermined interval, the alarm will be given.

Under certain conditions, it is desirable to fix a speed which may be maintained or exceeded for a relatively short predetermined interval as hereinabove described but to cause an alarm to be immediately given in the event that the speed of the vehicle during such deferred interval reaches another fixed speed, that is to say, in case the speed first set is exceeded by a predetermined number of miles per hour, and I have hereinafter referred to this limit as an excessive speed limit and to this end I mount on the shaft 5 a secondary-actuating pinion 31 which is preferably fast on the shaft 5, and which so soon as the actuating member 3 engages the same, will immediately cause a rotation of the shaft 5 and a giving of the alarm by the same means hereinabove described. It will be seen, therefore, that in case a driver does not pay attention to the warning and exceeds the speed set by the member 4 to an extent sufficient to cause engagement of the member 31, the alarm will be instantly given.

It is desirable to permit a testing of the device at a low speed for the purpose of determining whether it is in operating order, and for this purpose, I provide testing means for engaging the top of the shaft 5 and depressing the same to lower the position of the engaging members and thus to lower the speed at which the members 4 and 31 will operate the alarm. As illustrated, I provide a testing pin 32 which passes through an opening 32ª in the outer perimeter of the casing which registers with the bearing 5ª of the shaft 5. This testing pin 32 preferably is provided with a stop-pin 32′ to prevent withdrawal thereof from the casing, and, as shown, the stop-pin 32′ operates in a slot 33 in the bearing 5ª so as to permit depression of the testing pin to depress the shaft and cause an engagement or coupling with the speed-measuring member 3 at a lower speed. By this device, therefore, an officer may, by depression of the testing pin, cause the alarm to be given and a testing of the device while the vehicle is going at a low speed.

In the embodiment shown in Figs. 7 to 9 inclusive. C' indicates a rectangular casing adapted to be carried in visible or exposed position on an automobile and having a front plate provided with an opening substantially sector-shaped in conformation to expose a sector-shaped colored portion d' on a disc D' rotatably mounted within the casing, this arrangement being substantially similar to that shown and described in relation to Figs. 1 to 6.

Mounted within said casing C' is a centrifugal governor device G' in all respects similar to that hereinabove described in relation to Figs. 1 to 7, this governor device carrying an engaging member 43 which is adapted to engage at a set speed with an alarm-actuating gear or pinion 44 which is so mounted as to permit engagement and rotation for a predetermined length of time before causing the alarm to be sounded. In case the said set speed is exceeded to a predetermined extent, then the gear 43 will engage the gear 45 which is maintained in fixed position and is arranged to give an immediate alarm upon engagement.

The means for deferring the alarm-giving action in this embodiment comprises the mounting of the member 44 on a shaft 46 having a spiral groove 46' and providing the gear 44 with a pin 44' which engages within the spiral groove.

Obviously, if the shaft 46 is held against rotation, the rotation of the gear 44 by its engagement with the gear 43 will first cause an elevation of the shaft 46 until the pin 44 reaches the end of the spiral groove 46' after which the shaft 46 will be rotated. The shaft 46 is initially held against rotation by a hooked ratchet arm 48 which resiliently engages a ratchet 47 keyed to the said shaft. This is sufficient to overcome the resistance of the pin 44' in the spiral groove 46', but when the end of said groove is reached, rotation of the shaft 46 will rotate this ratchet to pull the arms 48 and 49 so that the spring 50 will cause the ball 51 to strike the bell 52 and give the alarm in the manner hereinabove described.

The immediate alarm-giving gear 45 is, as illustrated, formed in one piece and movable with the ratchet 47 so that any movement of this gear will immediately move the ratchet to give the alarm. As illustrated, this immediate alarm-giving gear 45 is adjustably mounted on the shaft 46 so that the speed at which the immediate alarm is given may be changed or varied and, as illustrated, the integral ratchet and gear 45 is provided with a key or feather 47' engaging a longitudinal slot 46' in the shaft 46. As shown, the adjustment of the gear 45 is obtained through the adjustment of an arm 48 which is provided at its outer end with a fork 48' engaging in a groove 45', said arm 48 having at its opposite end a nut 49 mounted to move vertically on an adjusting screw 50 which is mounted in bearings 51, 51' on an adjusting plate 52 which is, in turn, adjustably mounted in brackets 53, 53'. The plate is adjustably movable by the provision of slots 54, 54' engaged by screws 55, 55'.

The plate 52 also carries an arm 56 which is adapted to support the gear 44 on the shaft 46 with the pin 44' in the upper end of the spiral slot 46', and in this embodiment also, the position of the gears 44 and 45 is adjustable through the adjustment of the arm 56 and plate 52 to cause the deferred alarm and the immediate alarm to be given at any desirable set speeds. As indicated, the giving of the alarm at such varying set speeds is controlled by an adjusting shaft 57 having three screw-spurs 57', 57ª 57ᵇ of varying lengths so that upon rotation of the shaft 57 the arm 56 will be raised and lowered to raise and lower the gears on the shaft 46.

As illustrated, the adjusting plate 52 is held against one of the screws of the shaft 57 by means of a spring 58 stretched between the lower end thereof and the casing. The shaft 57, as illustrated, is mounted at its inner end in a bearing 59 and extends at its outer end through a bearing aperture 60 in the front wall of the housing and is provided at the outer side with a knob 61. Within the casing a disc D' similar to the disc D in the embodiment first described is provided with sector-shaped colored portions corresponding in number with the number of screw-spurs on the shaft 57.

In order to give an initial warning to the driver of the car during the deferred time-period while the gear 44 is engaged and before the alarm is given, I preferably oscillatably mount on the arm 56 a block by means of a screw 63 and fasten to this block 52 by a screw 64 a spring clapper 65 which is adapted to be engaged by pins 66 on the gear 44. The spring 65 will be prevented from rotation with the gear wheel by the pin 67 which engages a rear L-shaped portion 65' thereof, while the free end of the spring 65 will be held in position to act as a clapper by means of the stop-pins 67, 67', the former of which is engaged with the rear L-shaped portion 65 of the spring 64.

The operation of the two embodiments will be clear from the above description.

Having described my invention, I claim:—

1. A speed-controlling alarm device embodying, in combination, means having a movement variable in accordance with the speed of a vehicle, alarm mechanism having an alarm-actuating element normally operable by engagement with said speed-variable means at a predetermined position in its speed-variable movement, and an alarm-delaying element cooperating with said alarm-actuating element to delay the alarm-giving action of the latter for a predetermined period after engagement thereof by the speed-variable means.

2. A speed-controlling alarm device embodying, in combination, means having a movement variable in accordance with the speed of a vehicle, alarm mechanism having an alarm-actuating element operable by engagement with said speed-variable means at a predetermined position in its speed-variable movement, means for delaying the alarm-giving action of said alarm-actuating element for a predetermined period after engagement thereof by the speed-variable means, and means for giving an initial warning during such retarded period.

3. A speed-controlling alarm device embodying, in combination, means having a movement variable in accordance with the speed of a vehicle, alarm mechanism having an alarm-actuating element operable by engagement with said speed-variable means at a predetermined position in its speed-variable movement, means for delaying the alarm-giving action of said alarm-actuating element for a predetermined period after engagement thereof by the speed-variable means, a second alarm-actuating element engageable with said speed-variable means at another position in its speed-variable movement and operable to give an alarm immediately upon engagement therewith.

4. A speed-controlling alarm device embodying, in combination, means having a movement variable in accordance with the speed of a vehicle, alarm mechanism having an alarm-actuating element operable by engagement with said speed-variable means at a predetermined position in its speed-variable movement, means for delaying the alarm-giving action of said alarm-actuating element for a predetermined period after engagement thereof by the speed-variable means, said actuating element embodying a pinion operating on a shaft and said delaying means comprising a connection arranged to permit independent rotation of said pinion and shaft for a given number of revolutions and conjoint rotation thereafter.

5. A speed-controlling alarm device embodying, in combination, mechanism having a movement variable in accordance with the speed of a vehicle and provided with an actuating member, alarm-giving mechanism including an actuating shaft, a pinion on said shaft and engageable by the speed-variable actuating member and rotatable independently of said shaft for a given number of revolutions thereof, means actuated by the rotation of said actuating shaft to give a primary alarm and another pinion on said shaft engageable with said speed-variable mechanism and arranged to give an alarm immediately upon engagement.

In witness whereof, I have signed my name to the foregoing specification.

STERLING G. SEARS.